Sept. 25, 1928.
J. N. KALKANIS
CANDY MAKING MACHINE
Filed Feb. 18, 1926
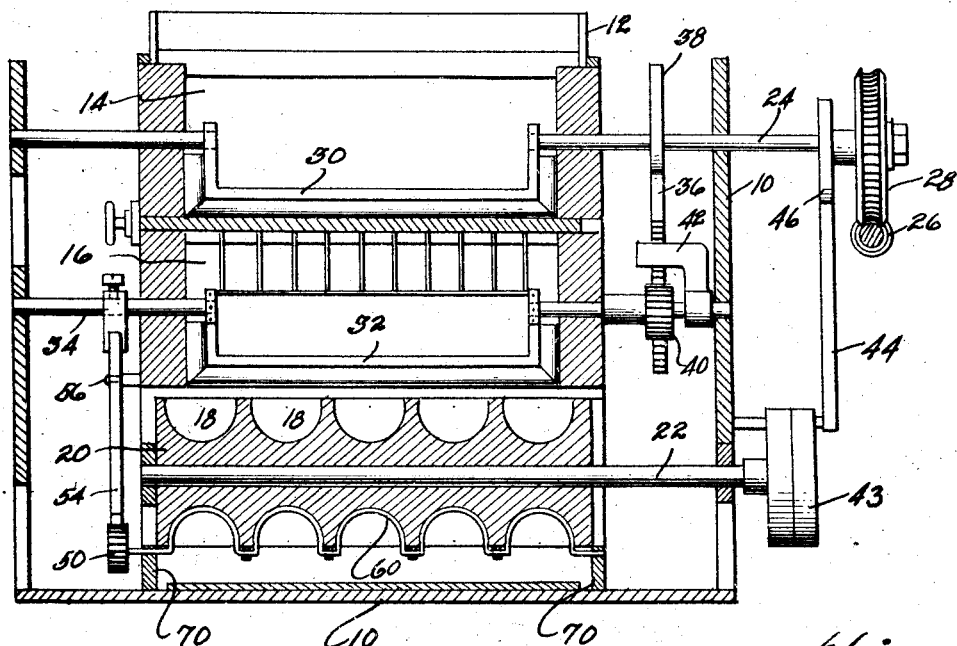
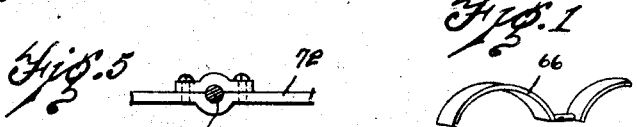
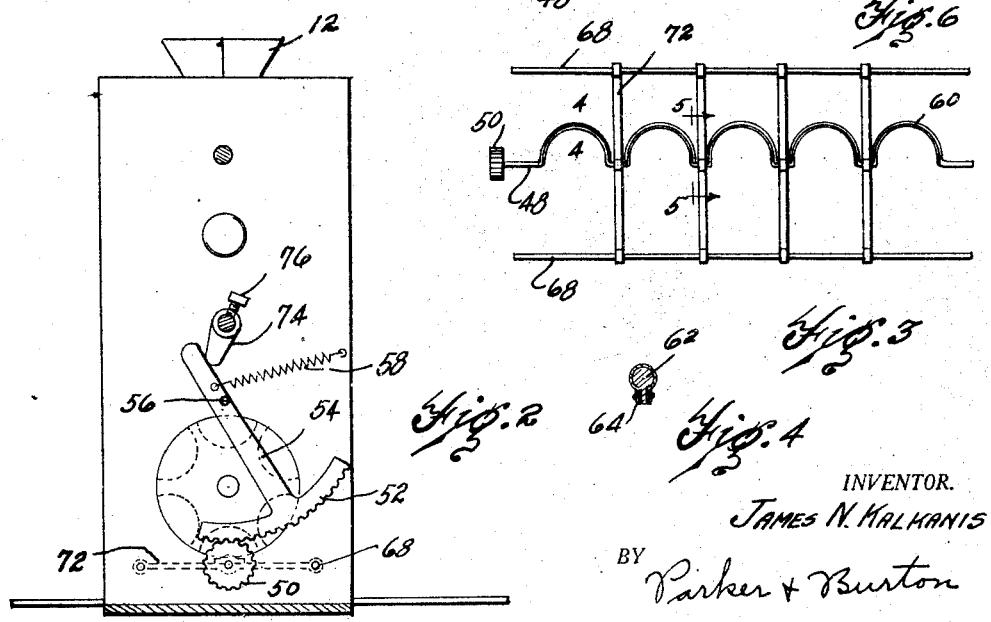
INVENTOR.
JAMES N. KALKANIS
BY
Parker + Burton
ATTORNEY.

Patented Sept. 25, 1928.

1,685,605

UNITED STATES PATENT OFFICE.

JAMES N. KALKANIS, OF DETROIT, MICHIGAN.

CANDY-MAKING MACHINE.

Application filed February 18, 1926. Serial No. 88,988.

My invention relates to improvements in candy making machines.

Reference is herein made to my Patent No. 1,570,748, dated January 26, 1926. This application relates to an improvement in the structure exhibited in such patent, such improvement residing particularly in the provision of simpler, more economical and improved means for loosening the molded candy from the molds.

The object lies in the provision in a machine of the character described of means in the form of a cutter or scraper so connected with the rotary mold as to be operatively actuated in co-ordination with rotation thereof to swing successively through the several molds of the carrier during the pauses in rotation of the carrier to loosen the molded candy from the molds.

Other objects and meritorious advantages will more fully appear from the following description, appended claims and accompanying drawing, in which:

Figure 1 is a vertical cross-sectional view through a machine provided with my improvement.

Fig. 2 is an end view of the machine shown in Fig. 1.

Fig. 3 is a plan view of the knife or cutter and its support.

Fig. 4 is a cross-sectional view taken on line 4—4, Fig. 3.

Fig. 5 is a cross-sectional view taken on line 5—5, Fig. 3.

Fig. 6 is a fragmentary perspective of a modified form of cutter.

As is more fully set forth in patent above referred to wherein the details of the general construction of the machine are shown and fully described, my machine comprises a frame 10 consisting of a base and upright end portions. There is a hopper 12 which opens into a chamber or receptacle 14 that in turn communicates with a mixing chamber 16, which mixing chamber has a discharge opening through which the mixed conglomerate is delivered to molds 18 provided in a mold carrier 20. The mold carrier is mounted upon a shaft 22 for rotation to bring successive molds into position to receive the discharge of the mixing chamber.

There is a main shaft 24 driven by a worm 26 and a gear 28. Mounted upon this main shaft is a scraper 30 which rotates within the upper receptacle 14. A suitable mixing device 32 is mounted upon a driven shaft 34 which is suitably supported in provided bearings and is driven by a rack 36 carried by an eccentric 38, which eccentric is mounted on the main shaft 24 and which rack engages a gear 40 carried by the shaft 34. 42 is a guide for the rack 36. The connection is such that the mixing element 32 is oscillated rotatably within the mixing chamber 16.

There is a ratchet arrangement not described in the present application but particularly described in the patent above referred to indicated generally as 43 which is driven by an arm 44 carried by an eccentric 46 also mounted on the shaft 24 through which the mold carrier is rotated step by step to bring successive molds into position to receive the discharge of the mixing chamber. The mold carrier is rotated interruptedly, that is, in a carrier of the character shown wherein there are provided six tiers of molds (see Fig. 2), the mold carrier is rotated through an arc of sixty degrees for each complete rotation of the main shaft 24 and during one-half of the period of rotation of such main shaft the mold carrier is stationary. During this period while the mold carrier is stationary, the cutter hereinafter described is swung through the molds to loosen the molded candy therefrom.

A suitable form of cutter is shown in Fig. 3. It comprises a shaft member 48 upon which is mounted a gear 50. This gear is engaged by a rack segment 52 carried by an oscillating arm 54 which is pivoted at 56 to the frame and held toward one side by a spring 58. The shaft carries a series of arcuate scrapers or cutters 60. In Fig. 4 these are shown in the form of scrapers constructed of a soft resilient core, such as rubber, in the shape shown in Fig. 4, indicated as 62, held between side plates 64. This scraper may, if desired, also be in the form of a cutter or knife such as indicated at 66 in Fig. 6. There are supports 68 which are carried by frame portions 70. These supports are spaced apart and have transversely-extending bearing members 72 which serve as bearing supports for the shaft 48.

During the operation of the machine the shaft 34 is rotatably oscillated as heretofore described. This shaft carries a cam member or short arm 74 which may be adjustably positioned by means of a set screw 76 upon the shaft and which is adapted to engage the upwardly-extending portion of the pivoted arm 54 that carries the segment. This cam 74 is so positioned upon the shaft 34 that it engages such arm to swing the same to actuate the cutter 60 during the time the mold carrier is stationary or during one of the interruptions in its rotation. It swings the cutter through the mold, loosening the conglomerate and as the shaft 34 swings back on its return oscillation the cutter is returned to its starting position. The ratio of the gear is such that the cutter swings through the molds at each pause in the rotation of the mold carrier, thereby loosening each molded product from its mold.

What I claim is:

1. In a machine of the class described, a frame, a mixing chamber having a discharge opening, a rotatably supported mold carrier having a mold adapted to be brought into position to receive the discharge of the mixing chamber during the rotation of the carrier, means for rotating said mold carrier, a cutter operatively supported upon the frame in proximity to but exteriorly of the mold carrier adapted to be swung through the mold between the surface thereof and the product therein to loosen the molded product therefrom, and means coupling the cutter with the mold carrier for operation in coordination therewith.

2. In a machine of the class described, a receptacle having a discharge opening, a rotatably supported mold carrier provided with a plurality of molds adapted to be successively brought into position to receive the discharge of the receptacle during the rotation of the carrier, and a cutter independently supported in proximity to said mold carrier and operatively associated therewith to successively swing through successive molds therein passing slidably over the surface of each mold to loosen the molded product for discharge therefrom.

3. In a machine of the class described, a frame, a receptacle supported upon the frame and having a discharge opening, a mold carrier rotatably supported upon the frame below the receptacle and provided with a plurality of series of linearly arranged mold cavities adapted during rotation of the carrier to be brought successively in position to receive the discharge of the receptacle, means for interruptedly rotating said mold carrier, a cutter element rotatably supported below said mold carrier in proximity thereto provided with a series of arcuate cutters, one for each mold cavity in a linear series of mold cavities, means coupled with said cutter element to swing the same through the mold cavities in a series during a pause in the rotation of the mold carrier.

4. A machine of the class described having a receptacle provided with a discharge outlet, a mold carrier positioned therebelow to receive the discharge therefrom, said mold carrier supported for rotation and provided with a series of mold cavities adapted to be successively brought into position below the receptacle during the rotation of the mold carrier, a cutter shaft rotatably supported below said mold carrier and provided with a cutter knife adapted to be swung through the successive mold cavities, driving mechanism coupled with the mold carrier to interruptedly rotate the same, and driving mechanism coupled with the cutter shaft and coordinated with the driving mechanism of the mold carrier to actuate the cutter shaft to swing the cutter knife through a mold cavity during a pause in the rotation of the mold carrier.

5. A machine having a receptacle provided with a discharge outlet, a rotatably supported cylindrical mold carrier positioned below the receptacle and provided with a plurality of circumferentially spaced series of correspondingly linearly arranged mold cavities adapted to be successively brought into position below the receptacle to receive the discharge therefrom during the rotation of the mold carrier, a pair of supports extending lengthwise the mold carrier below the mold carrier, said supports provided with transversely extending struts connected therewith spaced to correspond with the intervals between the linearly arranged mold cavities of the carrier, a cutter shaft supported upon said struts and provided with a plurality of arcuate cutter knives one between each pair of struts, driving mechanism coupled with the mold carrier to interruptedly rotate the same, driving mechanism coupled with the cutter shaft to oscillate the same, means coupling the driving mechanism for the carrier with the driving mechanism of the cutter shaft to oscillate the shaft during the pauses in rotation of the carrier, said cutter knives so shaped as to be swung through the mold cavities of the mold carrier during the oscillation of the cutter shaft.

In testimony whereof I sign this specification.

JAMES N. KALKANIS.